United States Patent
Ikeda et al.

(10) Patent No.: US 7,355,145 B2
(45) Date of Patent: Apr. 8, 2008

(54) ARC WELDING ROBOT

(75) Inventors: Tatsuya Ikeda, Hyogo (JP); Kei Aimi, Osaka (JP); Yasushi Mukai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 120 days.

(21) Appl. No.: 10/575,172

(22) PCT Filed: Jul. 8, 2005

(86) PCT No.: PCT/JP2005/012652
§ 371 (c)(1),
(2), (4) Date: Apr. 7, 2006

(87) PCT Pub. No.: WO2006/006517
PCT Pub. Date: Jan. 19, 2006

(65) Prior Publication Data
US 2007/0068910 A1    Mar. 29, 2007

(30) Foreign Application Priority Data
Jul. 12, 2004   (JP) ............................. 2004-204386

(51) Int. Cl.
*B23K 9/095* (2006.01)
(52) U.S. Cl. ................. 219/130.01; 219/125.1
(58) Field of Classification Search .......... 219/130.01, 219/125.1, 125.12, 124.34
See application file for complete search history.

(56) References Cited

U.S. PATENT DOCUMENTS

| | | | | |
|---|---|---|---|---|
| 6,133,545 A * | 10/2000 | Okazaki et al. | ........ | 219/130.01 |
| 6,271,500 B1 * | 8/2001 | Hirayama et al. | ..... | 219/130.01 |
| 6,297,472 B1 * | 10/2001 | Bong et al. | ............ | 219/125.12 |
| 6,459,958 B1 * | 10/2002 | Watanabe et al. | ........... | 700/264 |
| 6,583,386 B1 * | 6/2003 | Ivkovich | ................ | 219/130.01 |
| 6,744,011 B1 * | 6/2004 | Hu et al. | ............... | 219/130.01 |

FOREIGN PATENT DOCUMENTS

| | | | |
|---|---|---|---|
| JP | 5-329645 | | 12/1993 |
| JP | 07-100649 A | * | 4/1995 |
| JP | 2002-172574 A | * | 6/2002 |

* cited by examiner

*Primary Examiner*—Clifford C. Shaw
(74) *Attorney, Agent, or Firm*—Pearne & Gordon LLP

(57) ABSTRACT

The invention provides an arc welding robot capable of collecting and displaying waveform data in a welding operation without using an external device. The arc welding robot comprises: a manipulator 101 including a welding torch 124 mounted thereon; a control unit 102 for operating the manipulator 101 in a given operation pattern in accordance with a previously taught operation program, the control unit 102 including therein a welding control part 104 for welding a member to be welded 125 under a given welding condition, and a RAM 106 for recording waveform data relating to at least one of a welding current instruction value, a welding current output value, a welding voltage instruction value, a welding voltage output value, a welding speed, a wire feed speed, the number of times of short circuits and a wire feed motor current during a given period; and, display means for graphically displaying the waveform data recorded in the RAM 106.

9 Claims, 5 Drawing Sheets

FIG. 2

```
207
 ⌐
<Prog0001.prg>

201        203
  (    202    (
  )     )
  )     )

MOVE  P1   120.00m/min
MOVE  P2    10.00m/min
   WELD 120A  18.0V   ---204
   GAS ON             ---205
   ARC ON             ---206
MOVE  P3    1.50m/min
MOVE  P4    1.50m/min
   WELD 100A  17.0V
   ARC OFF
   GAS OFF
MOVE  P5   120.00n/min
            :
            :
```

FIG. 3

```
04,05,18,15,50,32
100us
Current output,Voltage output, Wire speed
223,18.2,10.5
223,18.2,10.5
223,18.2,10.5
223,18.2,10.5
223,18.2,10.5
```

FIG. 4

Recording stop trigger: ☑ Input [ 0: No ▽ ]
☑ Error ☐ Arc on ☐ Arc off

Sampling cycle: [ 50 ] ○ μs ●ms

Recording items:

☑ Instruction current ☐ Wire feed motor current
☑ Instruction voltage ☐ Wire feed speed
☑ Output current ☐ Welding speed
☑ Output voltage ☐ Number of times of short circuits

[ OK ] [ Cancel ]

ARC WELDING ROBOT

FIELD OF THE INVENTION

The present invention relates to an arc welding robot which not only includes recording means for recording welding waveform data but also has a function for graphically displaying the waveform data.

BACKGROUND OF THE INVENTION

Conventionally, when executing a welding operation, to analyze welding phenomena in a micro time region or to measure variations in welding outputs in a macro time region, separately from a welding apparatus or a robot control unit, there is connected a measuring device such as a multipurpose measuring logger or an arc sensor monitor device for collecting and displaying waveform data (For example, see patent literature 1).
Patent literature 1: JP Hei-5-329645 publication

DISCLOSURE OF THE INVENTION

Problems to be Solved by the Invention

However, according to the prior art, in every welding apparatus or in every robot, it is necessary to install a measuring device such as a multipurpose measuring logger or an arc sensor monitor device, which increases the cost of the welding apparatus or robot as well as takes time for installation thereof (for example, a wiring operation and an adjusting operation) when collecting data in the whole of the production facilities.

Also, the multipurpose measuring logger is unable to measure the number of times of short circuits in the welding phenomena and thus it is necessary to provide exclusive measuring means separately.

In view of the above-mentioned problems found in the prior art, it is an object of the invention to provide an arc welding robot which is capable of collecting and displaying waveform data in a welding operation.

Means for Solving the Problems

In attaining the above object, according to the invention, there is provided an arc welding robot which comprises: a manipulator with a welding torch mounted on the neighboring portion of the leading end thereof; a control unit for operating the manipulator in a given operation pattern in accordance with a previously taught operation program, the control unit including therein a welding part for welding a member to be welded under a given welding condition in accordance with the above operation pattern; recording means for recording waveform data relating to at least one of a welding current instruction value, a welding current output value, a welding voltage instruction value, a welding voltage output value, a welding speed, a wire feed speed, the number of times of short circuits, and a wire feed motor current during a given period; and, display means for graphically displaying the waveform data recorded in the recording means.

Thanks to the above structure, not only the waveform data relating to the following items can be detected without connecting an external device such as a multipurpose measuring logger, but also such waveform data can be recorded. That is, the items include: a welding speed to be instructed to the manipulator within the control unit, a welding voltage instruction value and a welding current instruction value to be instructed to the welding part within the control unit; a welding voltage and a welding current as well as the number of times of short circuits to be detected in the welding part for comparison with the welding conditions; and, a wire feed motor current to be applied to the wire feed motor and a wire feed speed respectively to be controlled by the welding part.

Effects of the Invention

According to the invention, there can be realized an arc welding robot which comprises recording means for recording measured waveform data and display means for graphically displaying the recorded waveform data. Thanks to this, without connecting an external device such as a multipurpose measuring logger or an arc sensor monitor device used in the prior art, the welding phenomena can be analyzed and variations in the welding outputs can be measured. Therefore, the arc welding robot according to the invention is effective for optimization of the welding phenomena and for improvement in the welding quality.

BRIEF DESCRIPTION OF THE DRAWINGS

FIG. 1(*b*) is a schematic block diagram of a welding part according to the embodiment of the invention, explaining its connecting state with its associated parts.

FIG. 2 is an explanatory view of an example of an operation program of the arc welding robot according to the embodiment of the invention.

FIG. 3 is an explanatory view of an example of a format of recording data according to the embodiment of the invention.

FIG. 4 is an explanatory view of an example of a screen to be displayed by display means according the embodiment of the invention.

BEST MODE FOR ENFORCING THE INVENTION

Embodiment

Now, description will be given below of the best mode for enforcing the invention with reference to the accompanying drawings.

Figure 1:
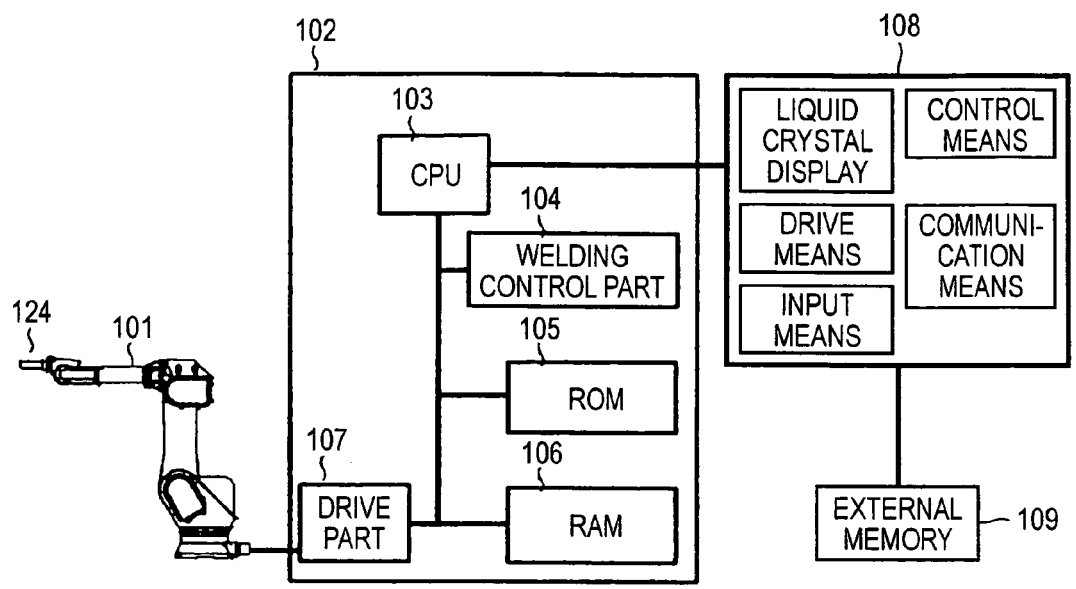
FIG. 1(*a*) is a schematic block diagram of an arc welding robot according to an embodiment of the invention.
Figure 1:
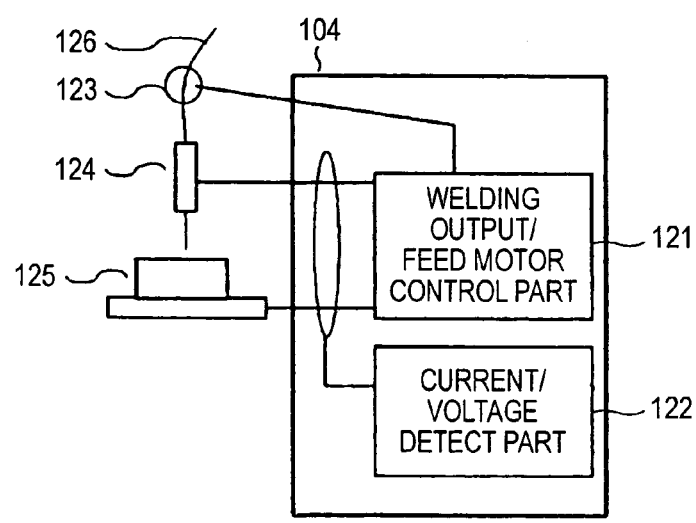

FIG. 1(*a*) is a schematic block diagram of an arc welding robot according to the present embodiment. In FIG. 1(*a*), reference character 101 designates a manipulator, 124 a welding torch, 102 a control unit for controlling the whole of the robot, and 108 a teach pendant for teaching and operating the manipulator and control unit to thereby create an operation program, respectively; and also, the teach pendant 108 includes a liquid crystal display screen (not shown), drive means (not shown) for controlling the display of the liquid crystal screen, and input means (not shown) for inputting various instructions.

109 designates an external memory or portable memory means (for example, a semiconductor memory card or a small-size hard disk) removably connected to the teach pendant 108 for storing an operation program and setting data taught by an operator, 103 a CPU for controlling the control unit itself, 104 a welding control part for controlling a welding operation, 105 a ROM for storing the software of the control unit, the software being interpreted by the CPU for operation, 106 a RAM for storing the operation program and setting data taught by the operator, and 107 a drive part for driving the manipulator 101.

Next, FIG. 1(*b*) is a schematic block diagram of the internal structure of the welding part 104 and also shows how the respective portions of the welding part are connected with their associated parts. In FIG. 1(*b*), 126 designates a welding wire which provides a consumable electrode when welding, 123 a feed motor for feeding the welding wire 126, 124 a welding torch which guides the welding wire 126 and provides an electrode for an welding output, 125 a welding member to be welded, 121 a welding output/feed motor control part for controlling the welding output and feed motor 123, and 122 a current/voltage detect part for detecting the current and voltage of the welding output, respectively.

Next, description will be given below of an example of the operation program with reference to FIG. 2.

In FIG. 2, 207 designates an operation program name and 201 stands for the operation instructions of the robot by which a linear operation, an arc operation and the like can be instructed; however, here, specific operations are not to be distinguished. 202 designates teaching point names which correspond to welding positions in the portion to be welded. The identifiers of the teaching point names can be set freely but, here, they are expressed as P1, P2, ---. 203 stands for moving speeds. In a welding block, speeds ranging from 0.3 m/min to 3.00 m/min are specified and, in a block where no welding is executed, a speed near to the maximum speed is often specified. 204 designates a welding condition instruction which is specified as welding conditions for conditions before start of the welding, during the welding and the terminating process of the end of the welding. Here, the current instruction value is expressed as 120 amperes and the voltage instruction value is expressed as 18.0 volts. 205 stands for an instruction to turn on/off a welding gas: that is, if the gas on is instructed, a gas valve (not shown) is opened to thereby supply the welding gas; and, if gas off is instructed, the gas valve is closed to thereby stop the supply of the welding gas.

206 designates an instruction for turning on/off an arc: that is, if the arc on is instructed, the welding output is output by the welding output/feed motor control part 121 to thereby apply a voltage into between the welding wire 126 and welding member 125 and, at the same time, the feed motor 123 is driven by the welding output/feed motor control part 121 to thereby feed the welding wire 126 toward the welding member 125.

If the welding wire 126 is contacted with the welding member 125, a short circuit current is allowed to flow and, at the same time, the short circuit is broken due to a fuse effect to thereby generate an arc of intense heat. From this time on, the short circuit and arc are generated repetitively so that the welding portion comes into an intense-heat state and is thus connected due to metal fusion. And, the number of times of short circuits when the short circuits and arcs are generated repetitively provides an element for management of the welding quality.

Description will be given below of the recording means for recording the waveform data during a given period.

As a welding current output value during welding, there is recorded an actual welding current value which is detected by the current/voltage detect part 122; as a welding voltage output value, there is recorded an actual welding voltage value which is detected by the current/voltage detect part 122; as a wire feed speed, there is recorded the wire feed speed value of the welding output/feed motor control part 121; as the number of times of short circuits, there is recorded the actual value of the number of times of short circuits that is detected by the current/voltage detect part 122; and, as a feed motor current, there is recorded the feed motor current value of the welding output/feed motor control part 121.

The recording process is executed under the control of the CPU 103: that is, the data is read out from the welding control part 104 and is transferred to and recorded in the RAM 106.

Next, FIG. 3 shows an example of the format of the recoding data.

In the format example shown in FIG. 3, in the first line, there are recorded the respective pieces of information on the year, month, day, hour, minute and second which have been recorded.

In the second line, there is recorded a sampling cycle when the data is recorded.

In the third line, there are recorded data items recorded; and, in the fourth and following lines, there are recorded waveform data which have been recorded.

Next, FIG. 4 shows an example of a screen for setting various conditions relating to the recording.

Specifically, FIG. 4 shows a screen to be displayed by the display means of the teach pendant 108 and, in this example, as conditions for stopping the recording, that is, as recording stop triggers, there can be properly set the presence or absence of input information, occurrence of an error, presence or absence of an arc on signal and presence or absence of an arc off signal.

Also, as a data collection sampling cycle for the waveform data (sampling repeating cycle), there can be selected a proper numerical value input and, as the unit thereof, there can be selected either a microsecond or a millisecond.

And, as the items of the waveform data to be recorded, there can be selected two or more items from the following items including the (welding) instruction current, (welding) instruction voltage, (welding) output current, (welding) output voltage, wire feed motor current, wire feed speed, welding speed, and the number of times of short circuits.

Figure 5:
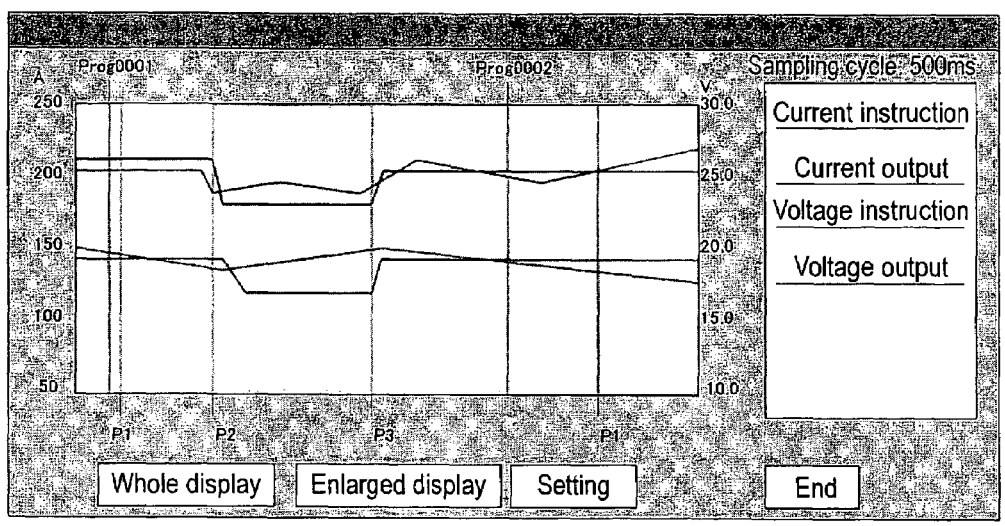
FIG. 5 is an explanatory view of an example for displaying waveform data on the display means in the form of a graphical representation according to the embodiment of the invention.

Next, FIG. 5 shows an example of the recorded waveform data which is displayed on the display means of the teaching pendant 108 as a graphical representation.

In this example, the sampling cycle is 500 ms; a welding instruction current value (shown by a solid line) applied to the welding control part 104 and an actual welding current value (shown by a broken line) detected by the welding control part 104 are shown in the upper part of the graphical representation; a welding instruction voltage value (shown by a solid line) applied to the welding control part 104 and an actual welding voltage value (shown by a broken line) detected by the welding control part 104 are shown in the lower part of the graphical representation; and, the respective teach points P1-P3 and the timings of the respective operation programs Prog0001, Prog0002 are shown in the horizontal axis direction.

In this graphical representation, the whole of the recoded waveform data can be displayed at a time while displaying the specific blocks enlargedly or in a reduced manner. Also, the contents of the display, for example, the display items and display forms can be changed by the setting function.

Figure 6:
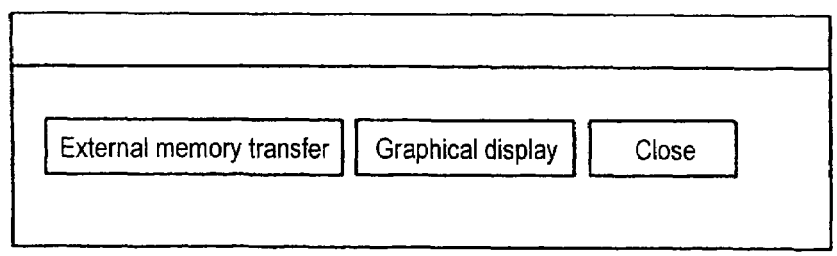
FIG. 6 is an explanatory view of an example of a screen for selecting either the transfer of the waveform data to external memory or the display thereof as a graphical representation according to the embodiment of the invention.

These recorded waveform data and information associated with them can be transferred to and held by the external memory 109 which is connected to the teaching pendant 108; and, such data are structured in such a manner that they can be used as a data base. The transfer of the waveform data to the external memory 109 or the graphical representation thereof, as shown in FIG. 6, can be properly selected.

By the way, in the above-mentioned embodiment, as the external memory 109, there is used portable memory means which is removably connected. However, other means can also be employed. For example, in the teach pendant 108, there may be provided communication means using a Bluetooth, an infra-red communication or an internet, thereby allowing communication with a computer which, for example, controls the production facilities. In this case, memory means connected to the computer can be used as the external memory.

Also, in the above-mentioned embodiment, as the display means thereof, there are used the liquid crystal display screen of the teach pendant 108 and the drive means of the teach pendant 108. However, the invention is not limited to this but, in the control unit 102, there may also be provided display means separately.

INDUSTRIAL PRACTICABILITY

An arc welding robot according to the invention can analyze the welding phenomena and variations in the welding output through a simple operation and is thereby effective for optimization of the welding phenomena and for improvement in the welding quality. That is, the present arc welding robot can be used effectively as production facilities.

The invention claimed is:

1. An arc welding robot, comprising:
a manipulator including a welding torch mounted in the vicinity of the leading end thereof;
a control unit for operating the manipulator in a given operation pattern in accordance with a previously taught operation program, the control unit including therein
a welding part for welding a member to be welded under a given welding condition in accordance with the operation pattern, and
recording means for recording a total number of short circuits occurring during a given period and waveform data relating to at least one of a welding current instruction value, a welding current output value, a welding voltage instruction value, a welding voltage output value, a welding speed, a wire feed speed, and a wire feed motor current during the given period; and,
display means for displaying said total number of short circuits along with a sampling cycle for the waveform data while graphically displaying the waveform data recorded in the recording means.

2. An arc welding robot as set forth in claim 1, wherein the recording means is capable of stopping its recording automatically using at least one of an input trigger, an error stop, an arc on and an arc off as its stop trigger.

3. An arc welding robot as set forth in claim 1, further including transfer means for transferring the waveform data recorded in the recording means to an external memory.

4. An arc welding robot as set forth in claim 3, wherein a portable memory means is used as the external memory and the external memory can be mounted onto and removed from a teach pendant to be connected to the control unit in order to create an operation program.

5. An arc welding robot as set forth in claim 3, wherein, in a teach pendant to be connected to the control unit in order to create an operation program, there is provided communication means capable of communicating with the external memory.

6. An arc welding robot as set forth in claim 1, wherein the display means includes a display control part for optionally adding or deleting the items of the waveform data to be displayed.

7. An arc welding robot as set forth in claim 1, wherein the display means can be used together with display means provided in a teach pendant to be connected to the control unit in order to create an operation program.

8. An arc welding robot, comprising:
a manipulator including a welding torch mounted in the vicinity of the leading end thereof;
a control unit for operating the manipulator in a given operation pattern in accordance with a previously taught operation program, the control unit including therein
a welding part for welding a member to be welded under a given welding condition in accordance with the operation pattern, and
recording means for recording waveform data relating to at least one of a welding current instruction value, a welding current output value, a welding voltage instruction value, a welding voltage output value, a welding speed, a wire feed speed, the number of times of short circuits and a wire feed motor current during a given period; and,
display means for graphically displaying the waveform data recorded in the recording means, wherein the display means includes a display control part for, when displaying the waveform data on a graph, enlarging and reducing the waveform data in the horizontal axis of the graph, for changing the scale of the vertical axis of the graph, and for displaying an operation program name, a teach point name and a sampling cycle.

9. A welding device, comprising:
an arc welding robot, said arc welding robot including:
a manipulator having a leading end and including a welding torch mounted near said leading end;
a control unit for operating the manipulator in a given operation pattern in accordance with a previously taught operation program, the control unit including a welding control part for controlling a welding operation, and a memory for recording data obtained during a given period, the data including a total number of short circuits occurring, a welding current instruction value, a welding current output value, a welding voltage instruction value, a welding voltage output value, a welding speed, a wire feed speed, and a wire feed motor current; and,
a teach pendant for creating the operation program, the teach pendant including a display for displaying said data while displaying a sampling cycle for said data, wherein a numerical value and unit for the sampling cycle can be set from the teach pendant.

* * * * *